April 25, 1933.  H. B. WEBSTER  1,905,546
INSTRUMENT FOR RECORDING INCLINATION
Filed Nov. 3, 1930
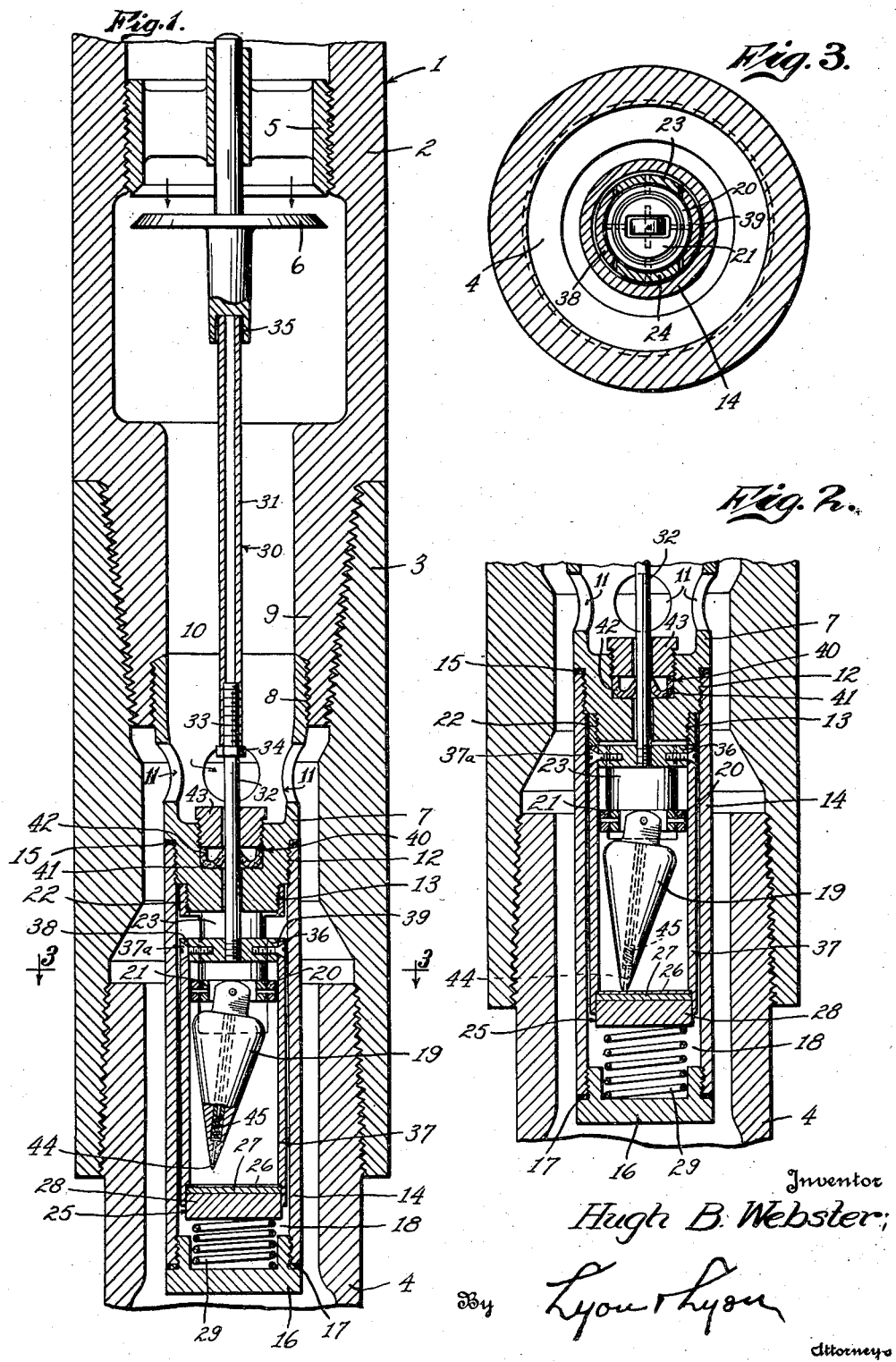
Inventor
Hugh B. Webster;
By Lyon & Lyon
Attorneys Patented Apr. 25, 1933

1,905,546

UNITED STATES PATENT OFFICE

HUGH B. WEBSTER, OF OAKLAND, CALIFORNIA, ASSIGNOR TO STANDARD OIL COMPANY OF CALIFORNIA, OF SAN FRANCISCO, CALIFORNIA, A CORPORATION OF DELAWARE

INSTRUMENT FOR RECORDING INCLINATION

Application filed November 3, 1930. Serial No. 492,905.

This invention relates to an instrument for recording the inclination of the drill pipe during the drilling of oil well bores and more specifically relates to an instrument adapted to be mounted in the drill collar or pipe and to be operated by the opening and closing of a standard drill pipe float valve.

In the drilling of oil wells the use of drill pipe and the forcing of a drilling fluid such as mud down through the drill pipe to wash out the cuttings is so common and so thoroughly understood by those skilled in the drilling art that further description is deemed unnecessary.

An instrument as described in these specifications and as illustrated in the accompanying drawing, as will be appreciated by those skilled in the art, is applicable for a great many different uses, but for the purpose of illustration, the invention will be described and illustrated as adapted to oil well surveying.

In drilling oil well bores, it is desirable to drill a straight hole which will be perpendicular to the normal surface of the earth. However, in the course of drilling the well, the drilling tool is often deflected, or, as commonly termed, "drifts" from its true course. The driller can often operate the drilling tool to bring the well bore back to its true course, providing he knows of the approximate locality of the "drift". It is, therefore, the principal object of this invention to provide an instrument which may be mounted in the drill pipe and arranged whereby the instrument may be actuated to record the inclination of the drill pipe where and when deemed necessary.

To withdraw the drill pipe requires considerable time and labor and is, therefore, expensive and consequently the drill pipe is run as long as possible before being withdrawn and it is, therefore, a further object of this invention to provide an instrument which may be actuated any number of times to check the inclination of the drill pipe during a single run of the drill pipe.

In order to distinguish and to check the readings taken at different depths during a single run of the drill pipe the instrument may be actuated once for the first reading, twice for the second reading and three times for the third reading and so on. In each case where more than one reading is taken at a given depth the drill pipe should be rotated more or less than 360 degrees and thus the two, three or more punch marks will fall on the same circle on the target and are thus easily identified. It is a further object of this invention to provide an instrument which may be caused to actuate one or more times to record the inclination of the drill pipe for any given depth.

It is a further object of this invention to provide an instrument which may be actuated responsive to the opening and closing of a standard drill pipe float valve.

It is a further object of this invention to provide an instrument which when mounted in the drill pipe will not materially interfere with or stop the flow of the drilling fluid pumped through the drill pipe.

It is a further object of this invention to provide an instrument which may be actuated responsive to the pressure of the drilling fluid.

It is a further object of this invention to provide an instrument having a sealed plumb-bob chamber.

It is a further object of this invention to provide an instrument having a replaceable recording disc.

Further objects and advantages will appear in the specification and drawing.

This invention consists in the novel parts and combinations of parts to be described hereinafter, all of which contribute to produce an efficient and easily operated instrument for recording the inclination of the drill pipe. A preferred embodiment of the invention is described in the following specifications and illustrated in the drawing, while the full scope of the invention is pointed out in the appended claims.

In the drawing:

Figure 1 is a longitudinal sectional view of the invention illustrating the position of the parts when the drilling fluid is being forced down the drill pipe causing the float valve to be held open and the plumb-bob to be held out of engagement with the recording disc.

Figure 2 is a partial view of Figure 1 but illustrating the plumb-bob in engagement with the recording disc.

Figure 3 is a sectional view taken substantially along lines 3—3 of Figure 1 looking in the direction of the arrows.

In the preferred embodiment of the invention, as illustrated in the drawing the lower end of the drill string 1 is illustrated comprising a portion of a drill pipe float 2, a tool joint 3 and a portion of the drill pipe 4 of usual and well known construction.

A standard form of float valve is suitably mounted in the drill pipe float and includes a seat member 5 and a float valve 6.

The instrument for recording the inclination of the drill pipe is mounted below the float valve by means of a sub 7 suitably screw threaded as at 8 into the pin 9 of the drill pipe float 2 and is provided with central bore 10 and circulation holes 11 to permit the flow of drilling fluid through and past sub 7.

The lower end of sub 7 is provided with two threaded shoulders 12 and 13 and upon the threaded shoulder 12 which is the larger of the two, a protecting shell 14 is screw threaded and made pressure tight by means of gasket 15. The protecting shell 14 is of smaller diameter than the internal diameter of tool joint 3 and drill pipe 4 so as not materially to interfere with the flow of the drilling fluid. The lower end of shell is screw threaded to receive a removable plug 16 which is made pressure tight by means of gasket 17 and thus there is formed a fluid tight chamber 18 in which a plumb-bob 19 is pivotally mounted upon gimbal rings 20 and 21.

To support the gimbal ring 20 from the sub 7 a gimbal sleeve 22 is screw threaded upon shoulder 13, and is provided with two downwardly extending arms 23 and 24 as clearly illustrated in Figures 1 and 3. The use of gimbal rings for pivotally mounting a plumb-bob so that the plumb-bob may swing freely about the pivot is well known that further explanation of this feature is deemed unnecessary.

A target or recording disc assembly 25 may be made of any suitable material such as wood or soft metal or as illustrated, of a paper target 26 mounted upon a cork disc 27 which in turn may be mounted upon a target plug 28. The paper target 26 may be inscribed with concentric circles one degree apart.

The target or recording disc assembly 25 is resiliently held in engagement with the needle of bob 19 by means of spring 29.

In order to move disc 25 out of engagement with bob 19 when float valve 6 is forced open by the pressure of the drilling fluid any suitable operating connection between valve 6 and disc 25 may be provided such for example as an adjustable piston rod 30 which may be composed of two rod members 31 and 32 screw threaded together as at 33 and provided with a locking means such as lock nut 34 for locking the two members of piston rod 30 in correct adjustment.

The upper end of piston rod 30 may be loosely fitted in a suitable hole 35 bored in the stem of float valve 6, while the lower end of piston rod 30 passes through sub 7 and is suitably secured to a cross head 36.

To transmit the motion from cross head 36 to the disc 25 a target sleeve 37 is secured to cross head 36 by any suitable means such as screws 37ª. A portion of the upper end of the target sleeve is cut away to provide working clearance for the two gimbal sleeve arms 23 and 24 thus leaving target sleeve arms 38 and 39 which are illustrated in relation to arms 23 and 24 in Figure 3. The lower end of target sleeve 37 is recessed to receive disc or target assembly 25 which is resiliently held in engagement therewith by means of spring 29 previously described.

To prevent the drilling fluid from entering the bob chamber 18 a stuffing box 40 is provided at the point where piston rod 30 passes through sub 7 which may comprise an enlarged bore 41 filled with suitable packing 42 and a packing gland 43.

In operation of the instrument the removable plug 16 is first removed thus permitting the removal of spring 29 and target or recording disc assembly 25. A new paper target 26 is placed upon the cork disc 27. The instrument is then inclined to an angle greater than 15 degrees, the parts which had previously been removed are replaced and due to the angle at which the instrument is held the target is pierced by the needle of the plumb-bob at its extreme edge.

Due to the action of spring 29 the target will be maintained in engagement with the needle until the float valve is forced open.

To prevent needle 44 of plumb-bob 19 from being forced too deeply into target 26 and cork disc 27 needle 44 may be slidably mounted in bob 19 and resiliently held extended by spring 45.

After a new target has been inserted the plumb-bob chamber 18 may be filled with any suitable fluid and then the instrument is ready to be assembled in the drill string and lowered into the well bore. The pumps are started forcing the drilling fluid down through the drill string 1 and the pressure of the drilling fluid upon float valve 6 forces valve 6 to open, which movement of float valve 6 is transmitted by the mechanism already described to move target 26 out of engagement with needle 44. The bob 19 is now free to swing freely and to seek a true vertical plane. The drilling operation is started by rotating the drill pipe and when it is desired that a reading be taken the rotation of the drill pipe is stopped but the pumps are continued in operation until bob 19 will have had sufficient time to come to rest in a true vertical plane, the pumps are then stopped which permits float valve 6 to close. Spring 29 raises the target assembly 25 and target 26 is pierced by needle 44 at some point depending upon the angle of inclination of the drill pipe. In order to distinguish the reading and also to secure a check reading the pumps should be started again, the drill pipe rotated more or less than 360 degrees and after sufficient time has elapsed for bob 19 to again come to rest in a true vertical plane the pumps are again stopped the target will again be raised and pierced by needle 44.

If this is done, two or three times at a given depth, two or three punch marks will be made which should all be on the same circle on target 26 and thus each set of readings may be identified.

After a set of readings have been taken the drilling operation is continued until a further set of readings is desired and by adding one more reading or selecting different angles through which the drill pipe is rotated this set of readings may be identified from previous sets of readings.

The depth of the well bore is noted for each set of readings and when the drill string is withdrawn and the target removed from the instrument the operator can ascertain if the well bore has drifted from its true course and if so the approximate locality of the drift. After noting the reading taken from target 26 in the drilling log the target may be filed away for future reference and a fresh target assembled into the instrument.

Having fully described my invention, it is to be understood that I do not wish to be limited to the details herein set forth, but my invention is of the full scope of the appended claims.

I claim:

1. In a float valve operated instrument for recording inclination including the combination of a float valve, a pivoted plumb-bob, a recording disc, and means operatively connecting said valve and said disc arranged to actuate said disc to and from recording engagement with said plumb-bob.

2. In a float valve operated instrument for recording inclination including the combination of a float valve, a recording means, and means operatively connecting said valve and said recording means arranged to actuate said recording means to and from recording engagement.

3. In an instrument for recording inclination including the combination of a float valve, a pivotally mounted plumb-bob, a recording disc, means for resiliently urging said disc into engagement with said bob, and means operatively connecting said valve and disc for moving said disc out of engagement with said bob.

4. In an instrument for recording inclination including the combination of a float valve arranged to be opened by fluid pressure, a pivotally mounted plumb-bob, a recording disc, means for resiliently urging said disc into engagement with said bob, and means operated by the opening of said valve for moving said disc out of engagement with said bob.

Signed at San Francisco this 29th day of October, 1930.

HUGH B. WEBSTER.